US009321870B2

(12) United States Patent
Kitagawa et al.

(10) Patent No.: US 9,321,870 B2
(45) Date of Patent: Apr. 26, 2016

(54) DIISOPROPYL FUMARATE-CINNAMIC ACID DERIVATIVE COPOLYMER AND RETARDATION FILM USING THE SAME

(71) Applicant: TOSOH CORPORATION, Shunan-shi (JP)

(72) Inventors: Takahiro Kitagawa, Mie (JP); Shinsuke Toyomasu, Mie (JP); Yasuyoshi Fujii, Mie (JP)

(73) Assignee: TOSOH CORPORATION, Shunan-shi (JP)

( * ) Notice: Subject to any disclaimer, the term of this patent is extended or adjusted under 35 U.S.C. 154(b) by 0 days.

(21) Appl. No.: 14/415,923

(22) PCT Filed: Jul. 16, 2013

(86) PCT No.: PCT/JP2013/069288
§ 371 (c)(1),
(2) Date: Jan. 20, 2015

(87) PCT Pub. No.: WO2014/013982
PCT Pub. Date: Jan. 23, 2014

(65) Prior Publication Data
US 2015/0232599 A1    Aug. 20, 2015

(30) Foreign Application Priority Data

Jul. 20, 2012   (JP) ................................ 2012-162071
Oct. 22, 2012   (JP) ................................ 2012-233176

(51) Int. Cl.
*C08F 222/14*   (2006.01)
*G02B 5/30*     (2006.01)
(Continued)

(52) U.S. Cl.
CPC ................ *C08F 222/14* (2013.01); *G02B 1/08* (2013.01); *G02B 5/3083* (2013.01); *G02F 1/133634* (2013.01); *G02F 2001/133638* (2013.01)

(58) Field of Classification Search
CPC ....... C08F 222/14; G02B 5/3083; G02B 1/08; G02F 1/133634; G02F 2001/133648
USPC ............................................... 526/318.1, 326
See application file for complete search history.

(56) References Cited

U.S. PATENT DOCUMENTS 5,245,456 A     9/1993  Yoshimi et al.
5,288,827 A *   2/1994  Li ........................... C08F 230/08
                                                          522/172

(Continued)

FOREIGN PATENT DOCUMENTS

CN        1584683        2/2005
CN        101140334      4/2011
(Continued)

OTHER PUBLICATIONS

International Search Report Issued Oct. 1, 2013 in PCT/JP13/069288 Filed Jul. 16, 2013.

(Continued)

*Primary Examiner* — Michael M Bernshteyn
(74) *Attorney, Agent, or Firm* — Oblon, McClelland, Maier & Neustadt, L.L.P.

(57) ABSTRACT

To provide a novel diisopropyl fumarate-cinnamic acid derivative-based copolymer expected to be formed into a retardation film having excellent optical properties ensuring that, for example, the refractive index in the film thickness direction and the out-of-plane retardation are large and even in the form of a thin film, the film has a high out-of-plane retardation, and a retardation film using the same. The diisopropyl fumarate-cinnamic acid derivative-based copolymer contains: a diisopropyl fumarate residue unit; and a cinnamic acid residue unit or a cinnamic acid ester residue unit having an alkyl group with a carbon number of 1 to 6.

13 Claims, 1 Drawing Sheet

(51) Int. Cl.
*G02B 1/08* (2006.01)
*G02F 1/13363* (2006.01)

(56) References Cited

U.S. PATENT DOCUMENTS

| | | | |
|---|---|---|---|
| 5,376,378 A | 12/1994 | Li et al. | |
| 8,545,970 B2 * | 10/2013 | Doi | B32B 27/36 349/158 |
| 2007/0298247 A1 * | 12/2007 | Makita | C08F 222/04 428/333 |
| 2008/0068545 A1 | 3/2008 | Doi et al. | |
| 2013/0102751 A1 | 4/2013 | Makita et al. | |

FOREIGN PATENT DOCUMENTS

| | | |
|---|---|---|
| GB | 905680 | 9/1962 |
| JP | 5 297223 | 11/1993 |
| JP | 5 323120 | 12/1993 |
| JP | 6 88909 | 3/1994 |
| JP | 6 287239 | 10/1994 |
| JP | 2818983 | 10/1998 |
| JP | 2002 182388 | 6/2002 |
| JP | 2005 156862 | 6/2005 |
| JP | 2006 193616 | 7/2006 |
| JP | 2008 112141 | 5/2008 |
| JP | 2008 120851 | 5/2008 |
| JP | 2008 129465 | 6/2008 |
| JP | 2011 107281 | 6/2011 |
| JP | 2012 32784 | 2/2012 |
| JP | 2012 97134 | 5/2012 |
| JP | 2012 136603 | 7/2012 |
| WO | 2012 005120 | 1/2012 |
| WO | WO 2012/053290 | 4/2012 |

OTHER PUBLICATIONS

Extended European Search Report issued Dec. 4, 2015 in corresponding European Patent Application No. 13819972.4.

R. L. Hemmings, et al. "Rates of polymerization of diethyl fumarate and trans-ethyl cinnamate at high pressures", vol. 27, serial No. 11, pp. 1819-1822.

* cited by examiner

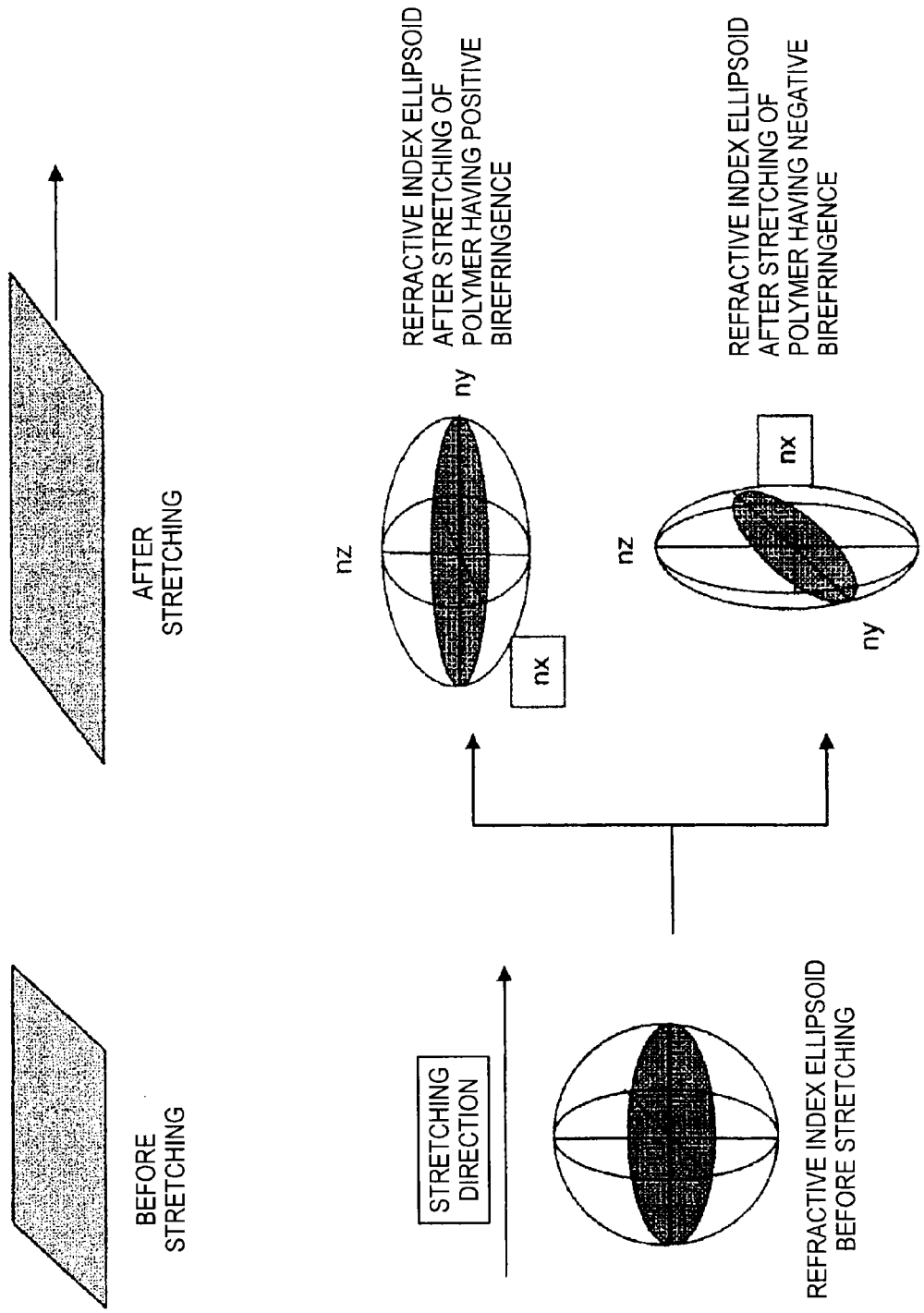

US 9,321,870 B2

DIISOPROPYL FUMARATE-CINNAMIC ACID DERIVATIVE COPOLYMER AND RETARDATION FILM USING THE SAME

TECHNICAL FIELD

The present invention relates to a novel diisopropyl fumarate-cinnamic acid derivative-based copolymer and a retardation film using the same. More specifically, the present invention relates to a novel diisopropyl fumarate-cinnamic acid derivative-based copolymer suitable for a retardation film having a high out-of-plane retardation even in the form of a thin film, particularly suitable for an optical compensation film of a liquid crystal display element.

BACKGROUND ART

A liquid crystal display is being widely used as a most important display device in the multimedia society, including applications ranging from a cellular phone to a computer monitor, a laptop computer and a television set. In a liquid crystal display, many optical films are used so as to enhance display characteristics, and, among others, a retardation film plays a great role, for example, in improving the contrast when viewed from the front and oblique directions and the color tone compensation. As the conventional retardation film, a polycarbonate or a cyclic polyolefin is used, and all of these polymers are a polymer having a positive birefringence. Here, the "positive" and "negative" of the birefringence are defined as follows.

The optical anisotropy of a polymer film provided with molecular orientation by stretching or the like can be expressed by a refractive index ellipsoid shown in FIG. 1. Here, in the case of a stretched film, the refractive index in the fast axis direction in the film plane is denoted by nx, the refractive index in the film in-plane direction orthogonal thereto is denoted by ny, and the refractive index in the thickness direction of the film is denoted by nz. Incidentally, the fast axis indicates an axial direction in which the refractive index in the film plane is low.

The negative birefringence means that the stretching direction becomes the fast axis direction, and the positive birefringence means that the direction perpendicular to the stretching direction becomes the fast axis direction.

That is, uniaxial stretching of a polymer having negative birefringence results in a small refractive index in the stretching axis direction (fast axis: stretching direction), and uniaxial stretching of a polymer having positive birefringence results in a small refractive index in the axial direction perpendicular to the stretching axis (fast axis: direction perpendicular to the stretching direction).

Many of polymers have positive birefringence. The polymer having negative birefringence includes an acrylic resin and polystyrene, but the acrylic resin develops small retardation and shows insufficient properties as a retardation film. The polystyrene has: a problem with the retardation stability, for example, its large photoelastic coefficient in the low temperature region allows a change of the retardation with a slight stress; a problem in the optical properties, that is, the wavelength dependency of the retardation is high; and furthermore, a practical problem that the heat resistance is low. Therefore, this polymer is not used at present.

The wavelength dependency of the retardation as used herein means that the retardation varies depending on the measuring wavelength, and this can be expressed as a ratio R450/R550 of the retardation measured at a wavelength of 450 nm (R450) to the retardation measured at a wavelength of 550 nm (R550). In general, a polymer having an aromatic structure strongly tends to have a large value of R450/R550, leading to reduction in the contrast or viewing angle characteristics in a low wavelength region.

A stretched film of a polymer showing negative birefringence has a high refractive index in the film thickness direction and can be an unprecedented retardation film, and therefore, this film is useful as a retardation film for compensating the viewing angle characteristics of a display such as super-twisted nematic liquid crystal display (STN-LCD), vertical-alignment liquid crystal display (VA-LCD), in-plane switching liquid crystal display (IPS-LCD) and reflective liquid crystal display (reflective LCD), or as a film for compensating the viewing angle of a polarizing plate, and the demand on the market for a retardation film having negative birefringence is strong.

Methods for producing a film with a heightened refractive index in the thickness direction of the film by using a polymer compound having positive birefringence have been proposed. One of these is a treatment method including adhering a heat-shrinkable film to one or both surfaces of a polymer film and heat-stretching the laminate to apply a shrinkage force in the film thickness direction of the polymer film (see, for example, Patent Documents 1 to 3). Also, a method of uniaxially stretching a polymer film in an in-plane direction while applying an electric field thereto has been proposed (see, for example, Patent Document 4).

In addition, a retardation film composed of fine particles having negative optical anisotropy and a transparent polymer compound has been proposed (see, for example, Patent Document 5).

However, the methods proposed in Patent Documents 1 to 4 have a problem that the production process is very complicated, resulting in poor productivity. Also, control of, e.g., uniformity of the retardation is extremely difficult compared with the conventional control by stretching.

In the case of using a polycarbonate as the base film, its large photoelastic coefficient at room temperature allows a change in the retardation with a slight stress, giving rise to a problem with the retardation stability. This film also has a problem of large wavelength dependency of the retardation.

The retardation film obtained in Patent Document 5 is a retardation film imparted with negative birefringence by adding fine particles having negative optical anisotropy, and in view of simplification and profitability of the production method, a retardation film not requiring the addition of fine particles is demanded.

Furthermore, a fumaric acid diester-based resin and a film composed of the resin have been proposed (see, for example, Patent Documents 6 to 10).

BACKGROUND ART DOCUMENT

Patent Document

Patent Document 1: Japanese Patent No. 2818983
Patent Document 2: JP-A-5-297223 (the term "JP-A" as used herein means an "unexamined published Japanese patent application")
Patent Document 3: JP-A-5-323120
Patent Document 4: JP-A-6-88909
Patent Document 5: JP-A-2005-156862
Patent Document 6: JP-A-2008-112141
Patent Document 7: JP-A-2012-032784
Patent Document 8: International Publication No. 2012/005120, pamphlet
Patent Document 9: JP-A-2008-129465
Patent Document 10: JP-A-2006-193616

SUMMARY OF INVENTION

Problem that Invention is to Solve

The fumaric acid diester-based resins and the films composed of the resin, proposed in Patent Documents 6 to 10, have a high out-of-plane retardation, but a film having a higher out-of-plane retardation even as a thin film is demanded at present.

An object of the present invention is to provide a novel diisopropyl fumarate-cinnamic acid derivative-based copolymer suitable for a retardation film excellent in the optical properties ensuring that even a thin film using the specific copolymer has a high out-of-plane retardation.

Means for Solving Problem

As a result of intensive studies to attain the above-described object, the present inventors have found that those problems can be solved by a specific diisopropyl fumarate-cinnamic acid derivative-based copolymer. The present invention has been accomplished based on this finding.

More specifically, the gist of the present invention resides in the following [1] to [6].

[1] A diisopropyl fumarate-cinnamic acid derivative-based copolymer, comprising:
a diisopropyl fumarate residue unit; and
a cinnamic acid residue unit or a cinnamic acid ester residue unit having an alkyl group with a carbon number of 1 to 6.

[2] Preferably, the diisopropyl fumarate-cinnamic acid derivative-based copolymer as described in [1] above, comprising:
from 50 to 99 mol % of a diisopropyl fumarate residue unit; and
from 1 to 50 mol % of a cinnamic acid residue unit or from 1 to 50 mol % of a cinnamic acid ester residue unit having an alkyl group with a carbon number of 1 to 6.

[3] Preferably, the diisopropyl fumarate-cinnamic acid derivative-based copolymer as described in [1] or [2] above, wherein a number average molecular weight in terms of standard polystyrene is from 30,000 to 500,000.

[4] Preferably, the diisopropyl fumarate-cinnamic acid derivative-based copolymer as described in any one of [1] to [3] above, which is a copolymer selected from the group consisting of a diisopropyl fumarate-methyl cinnamate copolymer, a diisopropyl fumarate-ethyl cinnamate copolymer, and a diisopropyl fumarate-isopropyl cinnamate copolymer.

[5] A retardation film using the diisopropyl fumarate-cinnamic acid derivative-based copolymer as described in any one of [1] to [4] above.

[6] Preferably, the retardation film as described in [5] above,
wherein when a refractive index in a fast axis direction in a film plane is denoted by nx, a refractive index in a film in-plane direction orthogonal thereto is denoted by ny, and a refractive index in a film thickness direction is denoted by nz, respective refractive indices satisfy relationship of $nx \leq ny < nz$.

Effects of Invention

The diisopropyl fumarate-cinnamic acid derivative-based copolymer of the present invention is a diisopropyl fumarate-cinnamic acid derivative-based copolymer suitable for a retardation film excellent in the optical properties ensuring that, for example, even a thin film has a high out-of-plane retardation and the refractive index in the film thickness direction is large, and among others, suitable for an optical compensation film of a liquid crystal display element.

BRIEF DESCRIPTION OF DRAWING

[FIG. 1] A view showing the change of the refractive index ellipsoid by stretching.

MODE FOR CARRYING OUT INVENTION

The diisopropyl fumarate-cinnamic acid derivative-based copolymer suitable for a retardation film of the present invention is described in detail below.

The diisopropyl fumarate-cinnamic acid derivative-based copolymer of the present invention contains a diisopropyl fumarate residue unit and a cinnamic acid residue unit or a cinnamic acid ester residue unit having an alkyl group with a carbon number of 1 to 6.

In the cinnamic acid ester residue unit having an alkyl group with a carbon number of 1 to 6, the alkyl group with a carbon number of 1 to 6 is independent of one another and includes, for example, a methyl group, an ethyl group, an n-propyl group, an isopropyl group, an n-butyl group, an isobutyl group, a tert-butyl group, an n-pentyl group, and an n-hexyl group. This alkyl group may be substituted with a halogen group such as fluorine and chlorine, an ether group, an ester group, an amino group, or the like. The cinnamic acid ester residue unit having an alkyl group with a carbon number of 1 to 6 includes, for example, a methyl cinnamate residue, an ethyl cinnamate residue, an n-propyl cinnamate residue, an isopropyl cinnamate residue, an n-butyl cinnamate residue, an isobutyl cinnamate residue, a tert-butyl cinnamate residue, an n-pentyl cinnamate residue, and an n-hexyl cinnamate residue. One of these or two or more thereof may be contained.

Specifically, the diisopropyl fumarate-cinnamic acid ester copolymer in the present invention includes, for example, a diisopropyl fumarate-methyl cinnamate copolymer, a diisopropyl fumarate-ethyl cinnamate copolymer, a diisopropyl fumarate-n-propyl cinnamate copolymer, a diisopropyl fumarate-isopropyl cinnamate copolymer, a diisopropyl fumarate-n-butyl cinnamate copolymer, a diisopropyl fumarate-isobutyl cinnamate copolymer, a diisopropyl fumarate-tert-butyl cinnamate copolymer, a diisopropyl fumarate-n-pentyl cinnamate copolymer, and a diisopropyl fumarate-n-hexyl cinnamate copolymer. Among these, a diisopropyl fumarate-methyl cinnamate copolymer, a diisopropyl fumarate-ethyl cinnamate copolymer, a diisopropyl fumarate-n-propyl cinnamate copolymer, a diisopropyl fumarate-isopropyl cinnamate copolymer, a diisopropyl fumarate-n-butyl cinnamate copolymer, a diisopropyl fumarate-isobutyl cinnamate copolymer, a diisopropyl fumarate-tert-butyl cinnamate copolymer, and the like are preferred, because when formed as a thin film, a film excellent in the retardation is more easily obtained.

The diisopropyl fumarate-cinnamic acid derivative-based copolymer of the present invention may contain other monomer residue units as long as they do not depart from the scope of the present invention, and other monomer residue units include, for example, one member or two or more members selected from a residue unit of styrenes, such as styrene residue unit and α-methylstyrene residue unit; a (meth) acrylic acid residue unit; a (meth)acrylic acid ester residue unit such as methyl (meth)acrylate residue unit, ethyl (meth) acrylate residue unit and butyl (meth)acrylate residue unit; a residue unit of vinyl esters, such as vinyl acetate residue unit and vinyl propionate residue unit; an acrylonitrile residue unit; a methacrylonitrile residue unit; a residue unit of vinyl ethers, such as methyl vinyl ether residue unit, ethyl vinyl ether residue unit and butyl vinyl ether residue unit; a residue unit of N-substituted maleimides, such as N-methylmaleimide residue unit, N-cyclohexylmaleimide residue unit and N-phenylmaleimide residue unit; a residue unit of olefins, such as ethylene residue unit and propylene residue unit; and a residue unit of fumaric acid diesters other than the diisopropyl fumarate residue unit, such as di-n-butyl fumarate residue unit and bis(2-ethylhexyl) fumarate residue unit.

For the reason that a retardation film formed becomes excellent in the retardation characteristics or strength, the composition of the diisopropyl fumarate-cinnamic acid derivative-based copolymer of the present invention preferably contains from 50 to 99 mol % of a diisopropyl fumarate residue unit and from 1 to 50 mol % of a cinnamic acid residue unit or from 1 to 50 mol % of a cinnamic acid ester residue unit having an alkyl group with a carbon number of 1 to 6, more preferably contains from 70 to 97 mol % of a diisopropyl fumarate residue unit and from 3 to 30 mol % of a cinnamic acid residue unit or from 3 to 30 mol % of a cinnamic acid ester residue unit having an alkyl group with a carbon number of 1 to 6.

In the diisopropyl fumarate-cinnamic acid derivative-based copolymer of the present invention, because of excellent mechanical properties, the number average molecular weight as determined in terms of standard polystyrene from an elution curve measured by gel permeation chromatography (GPC) is preferably from 30,000 to 500,000, more preferably from 30,000 to 300,000.

With respect to the production method of the diisopropyl fumarate-cinnamic acid derivative-based copolymer of the present invention, as long as the diisopropyl fumarate-cinnamic acid derivative-based copolymer is obtained, the copolymer may be produced by any method and, for example, can be produced by performing radical polymerization of diisopropyl fumarate and cinnamic acid or a cinnamic acid ester having an alkyl group with a carbon number of 1 to 6.

For the radical polymerization above, any known polymerization method, for example, a bulk polymerization method, a solution polymerization method, a suspension polymerization method, a precipitation polymerization method or an emulsion polymerization method, can be employed.

The polymerization initiator when performing radical polymerization includes, for example, an organic peroxide such as benzoyl peroxide, lauryl peroxide, octanoyl peroxide, acetyl peroxide, di-tert-butyl peroxide, tert-butyl cumyl peroxide, dicumyl peroxide, tert-butyl peroxyacetate and tert-butyl peroxybenzoate; and an azo-based initiator such as 2,2'-azobis(2,4-dimethylvaleronitrile), 2,2'-azobis(2-butyronitrile), 2,2'-azobisisobutyronitrile, dimethyl-2'-azobisisobutyrate and 1,1'-azobis(cyclohexane-1-carbonitrile).

The solvent usable in the solution polymerization method, suspension polymerization method, precipitation polymerization method or emulsion polymerization method is not particularly limited and includes, for example, an aromatic solvent such as benzene, toluene and xylene; an alcohol-based solvent such as methanol, ethanol, propanol and butanol; cyclohexane; dioxane; tetrahydrofuran; acetone; methyl ethyl ketone; dimethyl formamide; and isopropyl acetate; and further includes a mixed solvent thereof.

The polymerization temperature at the time of radical polymerization can be appropriately set according to the decomposition temperature of the polymerization initiator, and in general, the polymerization is preferably performed at 30 to 150° C., because the reaction control is easy.

When an optical film is obtained using the diisopropyl fumarate-cinnamic acid derivative-based copolymer, this film is excellent in the optical properties ensuring a high out-of-plane retardation even in the form of a thin film and therefore, is suitably used as a retardation film.

The retardation film of the present invention is a retardation film characterized in that when the refractive index in the fast axis direction in the film plane is denoted by nx, the refractive index in the film in-plane direction orthogonal thereto is denoted by ny, and the refractive index in the film thickness direction is denoted by nz, respective refractive indices satisfy the relationship of nx≤ny<nz. By satisfying nx≤ny<nz, a retardation film having excellent viewing angle compensation performance for STN-LCD, IPS-LCD, reflective LCD, transflective LCD, etc. is obtained. Incidentally, the three-dimensional refractive index of a film is generally controlled by stretching or the like of the film and therefore, the production process or quality control becomes complicated, but it has been found that the retardation film of the present invention exhibits a peculiar behavior such that the refractive index in the film thickness direction is high in an unstretched state.

In the case of using a diisopropyl fumarate-cinnamic acid copolymer as the diisopropyl fumarate-cinnamic acid derivative-based copolymer of the present invention, for the reason that the retardation film of the present invention becomes a retardation film more excellent in the optical properties, the out-of-plane retardation (Rth) represented by the following formula (a) as measured at a wavelength of 550 nm is preferably from −50 to −2,000 nm, more preferably from −100 to −500 nm.

In the case of using a diisopropyl fumarate-cinnamic acid ester copolymer as the diisopropyl fumarate-cinnamic acid derivative-based copolymer of the present invention, for the reason that the retardation film of the present invention becomes a retardation film more excellent in the optical properties, the out-of-plane retardation (Rth) represented by the following formula (a) as measured at a wavelength of 550 nm is preferably from −100 to −2,000 nm, more preferably from −100 to −500 nm, still more preferably from −180 to −500 nm.

$$Rth=((nx+ny)/2-nz)\times d \tag{a}$$

(wherein d is the thickness of the film).

In the case of using a diisopropyl fumarate-cinnamic acid copolymer as the diisopropyl fumarate-cinnamic acid derivative-based copolymer of the present invention, for the reason that the retardation film of the present invention has a high out-of-plane retardation even in the form of a thin film, the relationship between the film thickness and the out-of-plane retardation is, in terms of absolute value, preferably 4.5 nm/film thickness (μm) or more, more preferably from 5 to 15 nm/film thickness (μm).

In the case of using a diisopropyl fumarate-cinnamic acid ester copolymer as the diisopropyl fumarate-cinnamic acid derivative-based copolymer of the present invention, for the reason that the retardation film of the present invention has a high out-of-plane retardation even in the form of a thin film, the relationship between the film thickness and the out-of-plane retardation is, in terms of absolute value, preferably 5.5 nm/film thickness (μm) or more, more preferably from 6 to 15 nm/film thickness (μm).

The wavelength dependency of the retardation can be expressed as the ratio R450/R550 of the retardation (R450) measured at a wavelength of 450 nm to the retardation (R550) measured at a wavelength of 550 nm.

In the case of using a diisopropyl fumarate-cinnamic acid copolymer as the diisopropyl fumarate-cinnamic acid derivative-based copolymer of the present invention, the R450/R550 in the retardation film of the present invention is preferably 1.1 or less, more preferably 1.08 or less, still more preferably 1.05 or less.

In the case of using a diisopropyl fumarate-cinnamic acid ester copolymer as the diisopropyl fumarate-cinnamic acid derivative-based copolymer of the present invention, the R450/R550 in the retardation film of the present invention is preferably 1.2 or less, more preferably 1.18 or less, still more preferably 1.15 or less.

In the retardation film of the present invention, for the reason that the image quality characteristics when used in a liquid crystal display element are improved, the light transmittance is preferably 85% or more, more preferably 90% or more. Also, the haze (degree of cloudiness) of the retardation film is preferably 2% or less, more preferably 1% or less.

The production method of the retardation film of the present invention is not particularly limited and includes, for example, a solution casting method, a melt casting method, and other methods.

The solution casting method is a method where a solution (hereinafter referred to as dope) prepared by dissolving the diisopropyl fumarate-cinnamic acid derivative-based copolymer in a solvent is cast on a supporting substrate and then the solvent is removed by heating, etc. to obtain a film. At this time, as the method to cast the dope on a supporting substrate, for example, a T-die method, a doctor blade method, a bar coater method, a roll coater method and a lip coater method are used. Among others, a method of continuously extruding the dope from a die on a belt-shaped or drum-shaped supporting substrate is most commonly employed in industry. The supporting substrate used includes, for example, a glass substrate, a metal substrate such as stainless steel and ferrotype, and a film such as polyethylene terephthalate. In the case of forming a highly transparent film excellent in the thickness accuracy and surface smoothness by the solution casting method, the solution viscosity of the dope is a very important factor and is preferably from 10 to 20,000 cPs, more preferably from 100 to 10,000 cPs.

For the reason that the handling of the film is easy, the coating thickness after drying of the diisopropyl fumarate-cinnamic acid derivative-based copolymer is preferably from 1 to 200 µm, more preferably from 5 to 100 µm, still more preferably from 10 to 50 µm.

The melt casting method is a molding method where a diisopropyl fumarate-cinnamic acid derivative-based copolymer is melted in an extruder and extruded in a film form from the slit of a T-die and the film is taken off while cooling by a roll, an air, etc.

The retardation film of the present invention can be used by separating it from a glass substrate or another optical film as the base material or can also be used as a laminate with a glass substrate or another optical film as the base material.

In addition, the retardation film of the present invention can be laminated with a polarizing plate and used as a circularly or elliptically polarizing plate or can also be formed into a polarizing plate by laminating it with a polarizer containing polyvinyl alcohol/iodine or the like. Furthermore, the retardation films of the present invention can be laminated with each other, or the retardation film of the present invention can be laminated with another retardation film.

In the retardation film of the present invention, an antioxidant is preferably blended at the time of film molding or for the purpose of increasing heat stability of the retardation film itself. The antioxidant includes, for example, a hindered phenol-based antioxidant, a phosphorus-based antioxidant, and other antioxidants. These antioxidants may be used individually or in combination. For the reason that the antioxidant action is synergistically enhanced, a hindered antioxidant and a phosphorus-based antioxidant are preferably used in combination. At that time, it is more preferable, for example, to mix and use the phosphorus-based antioxidant in an amount of 100 to 500 parts by weight per 100 parts by weight of the hindered antioxidant. Also, in view of excellent antioxidant action, the amount of the antioxidant added is preferably from 0.01 to 10 parts by weight, more preferably from 0.5 to 1 part by weight, per 100 parts by weight of the diisopropyl fumarate-cinnamic acid derivative-based copolymer constituting the retardation film of the present invention.

Furthermore, for example, an ultraviolet absorber such as benzotriazole, benzophenone, triazine and benzoate may be blended as an ultraviolet absorber, if desired.

In the retardation film of the present invention, as long as the gist of the present invention is observed, other polymer compounds, a surfactant, a polymer electrolyte, an electrically conductive complex, an inorganic filler, a pigment, an antistatic agent, an anti-blocking agent, a lubricant, and the like may be blended.

According to the present invention, a diisopropyl fumarate-cinnamic acid derivative-based copolymer suitable for a retardation film having excellent optical properties ensuring that, for example, the refractive index in the film thickness direction is large, the out-of-plane retardation is large and the wavelength dependency is small, which is useful as a film for compensating the contrast or viewing angle characteristics of a liquid crystal display or as an antireflection film, can be provided.

EXAMPLES

The present invention is described below by referring to Examples, but the present invention is not limited to these Examples.

Incidentally, various physical properties described in Examples were measured by the following methods.

<Composition of Diisopropyl Fumarate-Cinnamic Acid Derivative-based Copolymer>

The composition was determined from the spectral analysis in proton nuclear magnetic resonance spectroscopy ($^1$H-NMR) by using a nuclear magnetic resonance analyzer (trade name: JNM-GX270, manufactured by JEOL Ltd.).

<Measurement of Number Average Molecular Weight>

The molecular weight was measured at 40° C. on a gel permeation chromatograph (GPC) apparatus (trade name: C0-8011 manufactured by Tosoh Corp. (equipped with column $GMH_{HR}$-H)) by using tetrahydrofuran as the solvent and determined as the value in terms of standard polystyrene.

<Evaluation Method of Transparency>

The total light transmittance and haze of the film were measured using a haze meter (trade name: NDH5000, manufactured by Nippon Denshoku Industries Co., Ltd.).

<Measurement of Refractive Index>

The refractive index was measured using an Abbe's refractometer (manufactured by Atago Co., Ltd.) in conformity with JIS K 7142 (1981).

<Measurement of Retardation and Three-dimensional Refractive Index of Film>

The retardation and three-dimensional refractive index were measured using an automatic birefringence meter (trade name: KOBRA-WR, manufactured by Oji Scientific Instruments).

Example 1

Synthesis 1 of Diisopropyl Fumarate/Cinnamic Acid Copolymer

A glass ampule having a volume of 75 mL was charged with 50 g (0.25 mol) of diisopropyl fumarate, 1.9 g (0.013 mol) of cinnamic acid and 0.29 g (0.0016 mol) of tert-butyl peroxypivalate as a polymerization initiator and after repeating purging with nitrogen and release of the pressure, sealed in the pressure-reduced state. This ampule was placed in a constant temperature bath at 50° C. and held for 48 hours, thereby performing radical polymerization. After the completion of polymerization reaction, the polymerization product was taken out of the ampule and dissolved in 400 g of tetrahydrofuran. The resulting polymer solution was added dropwise, for precipitation, to 3 L of methanol, and the precipitate was vacuum-dried at 80° C. for 10 hours to obtain 21 g of a diisopropyl fumarate/cinnamic acid copolymer (yield: 41%).

The number average molecular weight of the obtained diisopropyl fumarate/cinnamic acid copolymer was 138,000.

Also, the $^1$H-NMR measurement confirmed that the copolymer composition was diisopropyl fumarate residue unit/cinnamic acid residue unit=97/3 (mol %).

Example 2

Synthesis 2 of Diisopropyl Fumarate/Cinnamic Acid Copolymer

A glass ampule having a volume of 75 mL was charged with 50 g (0.25 mol) of diisopropyl fumarate, 6.5 g (0.044 mol) of cinnamic acid and 0.32 g (0.0018 mol) of tert-butyl peroxypivalate as a polymerization initiator and after repeating purging with nitrogen and release of the pressure, sealed in the pressure-reduced state. This ampule was placed in a constant temperature bath at 50° C. and held for 48 hours, thereby performing radical polymerization. After the completion of polymerization reaction, the polymerization product was taken out of the ampule and dissolved in 400 g of tetrahydrofuran. The resulting polymer solution was added dropwise, for precipitation, to 3 L of methanol, and the precipitate was vacuum-dried at 80° C. for 10 hours to obtain 19 g of a diisopropyl fumarate/cinnamic acid copolymer (yield: 34%).

The number average molecular weight of the obtained diisopropyl fumarate/cinnamic acid copolymer was 122,000.

Also, the $^1$H-NMR measurement confirmed that the copolymer composition was diisopropyl fumarate residue unit/cinnamic acid residue unit=90/10 (mol %).

Example 3

Synthesis 3 of Diisopropyl Fumarate/Cinnamic Acid Copolymer

A glass ampule having a volume of 75 mL was charged with 50 g (0.25 mol) of diisopropyl fumarate, 15.9 g (0.107 mol) of cinnamic acid and 0.21 g (0.0012 mol) of tert-butyl peroxypivalate as a polymerization initiator and after repeating purging with nitrogen and release of the pressure, sealed in the pressure-reduced state. This ampule was placed in a constant temperature bath at 50° C. and held for 48 hours, thereby performing radical polymerization. After the completion of polymerization reaction, the polymerization product was taken out of the ampule and dissolved in 400 g of tetrahydrofuran. The resulting polymer solution was added dropwise, for precipitation, to 3 L of methanol, and the precipitate was vacuum-dried at 80° C. for 10 hours to obtain 10 g of a diisopropyl fumarate/cinnamic acid copolymer (yield: 15%).

The number average molecular weight of the obtained diisopropyl fumarate/cinnamic acid copolymer was 65,000.

Also, the $^1$H-NMR measurement confirmed that the copolymer composition was diisopropyl fumarate residue unit/cinnamic acid residue unit=79/21 (mol %).

Example 4

Synthesis 1 of Diisopropyl Fumarate/Cinnamic Acid Ester Copolymer (Diisopropyl Fumarate/Ethyl Cinnamate Copolymer)

A glass ampule having a volume of 75 mL was charged with 50 g (0.25 mol) of diisopropyl fumarate, 2.3 g (0.013 mol) of ethyl cinnamate and 0.29 g (0.0016 mol) of tert-butyl peroxypivalate as a polymerization initiator and after repeating purging with nitrogen and release of the pressure, sealed in the pressure-reduced state. This ampule was placed in a constant temperature bath at 50° C. and held for 48 hours, thereby performing radical polymerization. After the completion of polymerization reaction, the polymerization product was taken out of the ampule and dissolved in 400 g of tetrahydrofuran. The resulting polymer solution was added dropwise, for precipitation, to 3 L of methanol, and the precipitate was vacuum-dried at 80° C. for 10 hours to obtain 16 g of a diisopropyl fumarate/cinnamic acid ester copolymer (yield: 31%).

The number average molecular weight of the obtained diisopropyl fumarate/cinnamic acid ester copolymer was 74,000.

Also, the $^1$H-NMR measurement confirmed that the copolymer composition was diisopropyl fumarate residue unit/ethyl cinnamate residue unit=95/5 (mol %).

Example 5

Synthesis 2 of Diisopropyl Fumarate/Cinnamic Acid Ester Copolymer (Diisopropyl Fumarate/Ethyl Cinnamate Copolymer)

A glass ampule having a volume of 75 mL was charged with 50 g (0.25 mol) of diisopropyl fumarate, 7.6 g (0.043 mol) of ethyl cinnamate and 0.32 g (0.0018 mol) of tert-butyl peroxypivalate as a polymerization initiator and after repeating purging with nitrogen and release of the pressure, sealed in the pressure-reduced state. This ampule was placed in a constant temperature bath at 50° C. and held for 48 hours, thereby performing radical polymerization. After the completion of polymerization reaction, the polymerization product was taken out of the ampule and dissolved in 400 g of tetrahydrofuran. The resulting polymer solution was added dropwise, for precipitation, to 3 L of methanol, and the precipitate was vacuum-dried at 80° C. for 10 hours to obtain 7 g of a diisopropyl fumarate/cinnamic acid ester copolymer (yield: 13%).

The number average molecular weight of the obtained diisopropyl fumarate/cinnamic acid ester copolymer was 55,000.

Also, the $^1$H-NMR measurement confirmed that the copolymer composition was diisopropyl fumarate residue unit/ethyl cinnamate residue unit=83/17 (mol %).

Example 6

Synthesis 3 of Diisopropyl Fumarate/Cinnamic Acid Ester Copolymer (Diisopropyl Fumarate-Ethyl Cinnamate Copolymer)

A glass ampule having a volume of 75 mL was charged with 50 g (0.25 mol) of diisopropyl fumarate, 18.9 g (0.107 mol) of ethyl cinnamate and 0.39 g (0.0023 mol) of tert-butyl peroxypivalate as a polymerization initiator and after repeating purging with nitrogen and release of the pressure, sealed in the pressure-reduced state. This ampule was placed in a constant temperature bath at 50° C. and held for 168 hours, thereby performing radical polymerization. After the completion of polymerization reaction, the polymerization product was taken out of the ampule and dissolved in 400 g of tetrahydrofuran. The resulting polymer solution was added dropwise, for precipitation, to 3 L of methanol, and the precipitate was vacuum-dried at 80° C. for 10 hours to obtain 13 g of a diisopropyl fumarate/cinnamic acid ester copolymer (yield: 19%).

The number average molecular weight of the obtained diisopropyl fumarate/cinnamic acid ester copolymer was 61,000.

Also, the $^1$H-NMR measurement confirmed that the copolymer composition was diisopropyl fumarate residue unit/ethyl cinnamate residue unit=71/29 (mol %).

Example 7

Synthesis 4 of Diisopropyl Fumarate/Cinnamic Acid Ester Copolymer (Diisopropyl Fumarate-Methyl Cinnamate Copolymer)

A glass ampule having a volume of 75 mL was charged with 50 g (0.25 mol) of diisopropyl fumarate, 7.2 g (0.043 mol) of methyl cinnamate and 0.16 g (0.0009 mol) of tert-butyl peroxypivalate as a polymerization initiator and after repeating purging with nitrogen and release of the pressure, sealed in the pressure-reduced state. This ampule was placed in a constant temperature bath at 46° C. and held for 168 hours, thereby performing radical polymerization. After the completion of polymerization reaction, the polymerization product was taken out of the ampule and dissolved in 400 g of tetrahydrofuran. The resulting polymer solution was added dropwise, for precipitation, to 3 L of methanol, and the precipitate was vacuum-dried at 80° C. for 10 hours to obtain 5 g of a diisopropyl fumarate/cinnamic acid ester copolymer (yield: 8%).

The number average molecular weight of the obtained diisopropyl fumarate/cinnamic acid ester copolymer was 78,000.

Also, the $^1$H-NMR measurement confirmed that the copolymer composition was diisopropyl fumarate residue unit/methyl cinnamate residue unit=86/14 (mol %).

Example 8

Synthesis 5 of Diisopropyl Fumarate/Cinnamic Acid Ester Copolymer (Diisopropyl Fumarate-Isopropyl Cinnamate Copolymer)

A glass ampule having a volume of 75 mL was charged with 50 g (0.25 mol) of diisopropyl fumarate, 8.4 g (0.043 mol) of isopropyl cinnamate and 0.32 g (0.0018 mol) of tert-butyl peroxypivalate as a polymerization initiator and after repeating purging with nitrogen and release of the pressure, sealed in the pressure-reduced state. This ampule was placed in a constant temperature bath at 50° C. and held for 48 hours, thereby performing radical polymerization. After the completion of polymerization reaction, the polymerization product was taken out of the ampule and dissolved in 400 g of tetrahydrofuran. The resulting polymer solution was added dropwise, for precipitation, to 3 L of methanol, and the precipitate was vacuum-dried at 80° C. for 10 hours to obtain 9 g of a diisopropyl fumarate/cinnamic acid ester copolymer (yield: 16%).

The number average molecular weight of the obtained diisopropyl fumarate/cinnamic acid ester copolymer was 50,000.

Also, the $^1$H-NMR measurement confirmed that the copolymer composition was diisopropyl fumarate residue unit/isopropyl cinnamate residue unit=85/15 (mol %).

Synthesis Example 1

Synthesis 1 of Fumaric Acid Diester-Based Copolymer (Diisopropyl Fumarate/di-n-Butyl Fumarate Copolymer)

A 1-L autoclave equipped with a stirrer, a cooling tube, a nitrogen inlet tube and a thermometer was charged with 1.6 g of hydroxypropylmethyl cellulose (trade name: Metolose 60SH-50, produced by Shin-Etsu Chemical Co., Ltd.), 520 g of distilled water, 230 g of diisopropyl fumarate, 50 g of di-n-butyl fumarate and 2.1 g of tert-butyl peroxypivalate as a polymerization initiator and after nitrogen bubbling for 1 hour, the mixture was held at 50° C. for 24 hours with stirring at 400 rpm, thereby performing radical suspension polymerization. The polymer particle-containing liquid suspension produced was cooled to room temperature and separated by filtration, and the obtained particle was washed with distilled water and methanol to obtain a fumaric acid diester-based copolymer (yield: 80%).

The number average molecular weight of the obtained fumaric acid diester-based copolymer was 150,000. Also, the $^1$H-NMR measurement confirmed that the copolymer composition was diisopropyl fumarate residue unit/di-n-butyl fumarate residue unit=87/13 (mol %).

Synthesis Example 2

Synthesis 2 of Fumaric Acid Diester-based Copolymer (Diisopropyl Fumarate/Bis-2-Ethylhexyl Fumarate Copolymer)

A 1-L autoclave equipped with a stirrer, a cooling tube, a nitrogen inlet tube and a thermometer was charged with 1.6 g of hydroxypropylmethyl cellulose (trade name: Metolose 60SH-50, produced by Shin-Etsu Chemical Co., Ltd.), 520 g of distilled water, 196 g of diisopropyl fumarate, 84 g of bis-2-ethylhexyl fumarate and 1.9 g of tert-butyl peroxypivalate as a polymerization initiator and after nitrogen bubbling for 1 hour, the mixture was held at 50° C. for 24 hours with stirring at 400 rpm, thereby performing radical suspension polymerization. The polymer particle-containing liquid suspension produced was cooled to room temperature and separated by filtration, and the obtained particle was washed with distilled water and methanol to obtain a fumaric acid diester-based copolymer (yield: 66%).

The number average molecular weight of the obtained fumaric acid diester-based copolymer was 86,000. Also, the $^1$H-NMR measurement confirmed that the copolymer composition was diisopropyl fumarate residue unit/bis-2-ethylhexyl fumarate residue unit=84/16 (mol %).

Synthesis Example 3

Synthesis of Diisopropyl Fumarate Homopolymer

A 1-L autoclave equipped with a stirrer, a cooling tube, a nitrogen inlet tube and a thermometer was charged with 1.6 g of hydroxypropylmethyl cellulose (trade name: Metolose 60SH-50, produced by Shin-Etsu Chemical Co., Ltd.), 520 g of distilled water, 280 g of diisopropyl fumarate and 2 g of tert-butyl peroxypivalate as a polymerization initiator and after nitrogen bubbling for 1 hour, the mixture was held at 50° C. for 24 hours with stirring at 400 rpm, thereby performing radical suspension polymerization. The polymer particle-containing liquid suspension produced was cooled to room temperature and separated by filtration, and the obtained particle was washed with distilled water and methanol to obtain a diisopropyl fumarate homopolymer (yield: 75%).

The number average molecular weight of the obtained diisopropyl fumarate homopolymer was 120,000.

Example 9

The diisopropyl fumarate/cinnamic acid copolymer obtained in Example 1 was dissolved in methyl isobutyl ketone to form a 15 wt % resin solution, and the resin solution was cast on a polyethylene terephthalate film by a coater and dried at 130° C. for 10 minutes to obtain a 30 μm-thick film using a diisopropyl fumarate/cinnamic acid copolymer.

The obtained film had a total light transmittance of 92%, a haze of 0.5%, and a refractive index of 1.474.

The three-dimensional refractive indices were $n_x$=1.4716, $n_y$=1.4716, and $n_z$=1.4773. Thus, in the obtained film, $n_x$=$n_y$<$n_z$ and the refractive index in the film thickness direction showed a large value. Also, the out-of-plane retardation Rth was negatively as large as −170 nm, and the ratio of retardations (R450/R550) (wavelength dependency) was 1.05. In addition, the absolute value of the out-of-plane retardation relative to the film thickness was 5.7.

These results reveal that the obtained film has negative birefringence, where the refractive index in the thickness direction is large, the out-of-plane retardation is negatively large and a high out-of-plane retardation is obtained even in a thin film, and therefore, is suitable for a retardation film.

Example 10

The diisopropyl fumarate/cinnamic acid copolymer obtained in Example 2 was dissolved in a mixed solvent of toluene/methyl isobutyl ketone to form a 15 wt % resin solution, and the resin solution was cast on a polyethylene terephthalate film by a coater and dried at 130° C. for 10 minutes to obtain a 30 μm-thick film using a diisopropyl fumarate/cinnamic acid copolymer.

The obtained film had a total light transmittance of 92%, a haze of 0.6%, and a refractive index of 1.482.

The three-dimensional refractive indices were $n_x$=1.4796, $n_y$=1.4796, and $n_z$-1.4861. Thus, in the obtained film, $n_x$=$n_y$<$n_z$ and the refractive index in the film thickness direction showed a large value. Also, the out-of-plane retardation Rth was negatively as large as −194 nm, and the ratio of retardations (R450/R550) (wavelength dependency) was 1.07. In addition, the absolute value of the out-of-plane retardation relative to the film thickness was 6.5.

These results reveal that the obtained film has negative birefringence, where the refractive index in the thickness direction is large, the out-of-plane retardation is negatively large and a high out-of-plane retardation is obtained even in a thin film, and therefore, is suitable for a retardation film.

Example 11

The diisopropyl fumarate/cinnamic acid copolymer obtained in Example 3 was dissolved in a mixed solvent of ethyl acetate/methyl isobutyl ketone to form a 15 wt % resin solution, and the resin solution was cast on a polyethylene terephthalate film by a coater and dried at 130° C. for 10 minutes to obtain a 15 μm-thick film using a diisopropyl fumarate/cinnamic acid copolymer.

The obtained film had a total light transmittance of 92%, a haze of 0.7%, and a refractive index of 1.495.

The three-dimensional refractive indices were $n_x$=1.4925, $n_y$=1.4925, and $n_z$=1.4991. Thus, in the obtained film, $n_x$=$n_y$<$n_z$ and the refractive index in the film thickness direction showed a large value. Also, the out-of-plane retardation Rth was negatively as large as −99 nm, and the ratio of retardations (R450/R550) (wavelength dependency) was 1.10. In addition, the absolute value of the out-of-plane retardation relative to the film thickness was 7.6.

These results reveal that the obtained film has negative birefringence, where the refractive index in the thickness direction is large, the out-of-plane retardation is negatively large and a high out-of-plane retardation is obtained even in a thin film, and therefore, is suitable for a retardation film.

Example 12

The diisopropyl fumarate/cinnamic acid ester copolymer obtained in Example 4 was dissolved in methyl isobutyl ketone to form a 15 wt % resin solution, and the resin solution was cast on a polyethylene terephthalate film by a coater and dried at 130° C. for 10 minutes to obtain a 30 μm-thick film using a diisopropyl fumarate/cinnamic acid ester copolymer.

The obtained film had a total light transmittance of 92%, a haze of 0.7%, and a refractive index of 1.475.

The three-dimensional refractive indices were $n_x$=1.4729, $n_y$=1.4729, and $n_z$=1.4789. Thus, in the obtained film, $n_x$=$n_y$<$n_z$ and the refractive index in the film thickness direction showed a large value. Also, the out-of-plane retardation Rth was negatively as large as −180 nm, and the ratio of retardations (R450/R550) (wavelength dependency) was 1.05. In addition, the absolute value of the out-of-plane retardation relative to the film thickness was 6.0.

These results reveal that the obtained film has negative birefringence, where the refractive index in the thickness direction is large, the out-of-plane retardation is negatively large and a high out-of-plane retardation is obtained even in a thin film, and therefore, is suitable for a retardation film.

Example 13

The diisopropyl fumarate/cinnamic acid ester copolymer obtained in Example 5 was dissolved in a mixed solvent of toluene/methyl isobutyl ketone to form a 15 wt % resin solution, and the resin solution was cast on a polyethylene terephthalate film by a coater and dried at 130° C. for 10 minutes to obtain a 30 μm-thick film using a diisopropyl fumarate/cinnamic acid ester copolymer.

The obtained film had a total light transmittance of 92%, a haze of 0.6%, and a refractive index of 1.487.

The three-dimensional refractive indices were nx=1.4848, ny=1.4848, and nz=1.4915. Thus, in the obtained film, nx=ny<nz and the refractive index in the film thickness direction showed a large value. Also, the out-of-plane retardation Rth was negatively as large as −201 nm, and the ratio of retardations (R450/R550) (wavelength dependency) was 1.11. In addition, the absolute value of the out-of-plane retardation relative to the film thickness was 6.7.

These results reveal that the obtained film has negative birefringence, where the refractive index in the thickness direction is large, the out-of-plane retardation is negatively large and a high out-of-plane retardation is obtained even in a thin film, and therefore, is suitable for a retardation film.

Example 14

The diisopropyl fumarate/cinnamic acid ester copolymer obtained in Example 6 was dissolved in a mixed solvent of ethyl acetate/methyl isobutyl ketone to form a 15 wt % resin solution, and the resin solution was cast on a polyethylene terephthalate film by a coater and dried at 130° C. for 10 minutes to obtain a 30 μm-thick film using a diisopropyl fumarate/cinnamic acid ester copolymer.

The obtained film had a total light transmittance of 92%, a haze of 0.6%, and a refractive index of 1.505.

The three-dimensional refractive indices were nx=1.5012, ny=1.5012, and nz=1.5088. Thus, in the obtained film, nx=ny<nz and the refractive index in the film thickness direction showed a large value. Also, the out-of-plane retardation Rth was negatively as large as −228 nm, and the ratio of retardations (R450/R550) (wavelength dependency) was 1.14. In addition, the absolute value of the out-of-plane retardation relative to the film thickness was 7.6.

These results reveal that the obtained film has negative birefringence, where the refractive index in the thickness direction is large, the out-of-plane retardation is negatively large and a high out-of-plane retardation is obtained even in a thin film, and therefore, is suitable for a retardation film.

Example 15

The diisopropyl fumarate/cinnamic acid ester copolymer obtained in Example 7 was dissolved in a mixed solvent of toluene/methyl ethyl ketone to form a 15 wt % resin solution, and the resin solution was cast on a polyethylene terephthalate film by a coater and dried at 130° C. for 10 minutes to obtain a 30 μm-thick film using a diisopropyl fumarate/cinnamic acid ester copolymer.

The obtained film had a total light transmittance of 92%, a haze of 0.6%, and a refractive index of 1.489.

The three-dimensional refractive indices were nx=1.4851, ny=1.4851, and nz=1.4915. Thus, in the obtained film, nx=ny<nz and the refractive index in the film thickness direction showed a large value. Also, the out-of-plane retardation Rth was negatively as large as −192 nm, and the ratio of retardations (R450/R550) (wavelength dependency) was 1.10. In addition, the absolute value of the out-of-plane retardation relative to the film thickness was 6.4.

These results reveal that the obtained film has negative birefringence, where the refractive index in the thickness direction is large, the out-of-plane retardation is negatively large and a high out-of-plane retardation is obtained even in a thin film, and therefore, is suitable for a retardation film.

Example 16

The diisopropyl fumarate/cinnamic acid ester copolymer obtained in Example 8 was dissolved in toluene to form a 15 wt % resin solution, and the resin solution was cast on a polyethylene terephthalate film by a coater and dried at 130° C. for 10 minutes to obtain a 30 μm-thick film using a diisopropyl fumarate/cinnamic acid ester copolymer.

The obtained film had a total light transmittance of 92%, a haze of 0.7%, and a refractive index of 1.486.

The three-dimensional refractive indices were nx=1.4845, ny=1.4845, and nz=1.4910. Thus, in the obtained film, nx=ny<nz and the refractive index in the film thickness direction showed a large value. Also, the out-of-plane retardation Rth was negatively as large as −195 nm, and the ratio of retardations (R450/R550) (wavelength dependency) was 1.11. In addition, the absolute value of the out-of-plane retardation relative to the film thickness was 6.5.

These results reveal that the obtained film has negative birefringence, where the refractive index in the thickness direction is large, the out-of-plane retardation is negatively large and a high out-of-plane retardation is obtained even in a thin film, and therefore, is suitable for a retardation film.

Comparative Example 1

The fumaric acid diester-based copolymer obtained in Synthesis Example 1 was dissolved in a mixed solvent of toluene/methyl ethyl ketone=50/50 to form a 20 wt % resin solution, and the resin solution was cast on a polyethylene terephthalate film by a coater and dried at 70° C. for 10 minutes to obtain a 30 μm-thick film.

The obtained film had a total light transmittance of 92%, a haze of 0.6%, and a refractive index of 1.472.

The three-dimensional refractive indices were nx=1.4712, ny=1.4712, and nz=1.4743. Thus, in the obtained film, nx=ny<nz and the refractive index in the film thickness direction was large, but the out-of-plane retardation was −93 nm and the absolute value of the out-of-plane retardation relative to the film thickness was as small as 3.1.

Comparative Example 2

The fumaric acid diester-based copolymer obtained in Synthesis Example 2 was dissolved in a mixed solvent of toluene/methyl ethyl ketone=50/50 to form a 20 wt % resin solution, and the resin solution was cast on a polyethylene terephthalate film by a coater and dried at 70° C. for 10 minutes to obtain a 30 μm-thick film.

The obtained film had a total light transmittance of 92%, a haze of 0.6%, and a refractive index of 1.473.

The three-dimensional refractive indices were nx=1.4723, ny=1.4723, and nz=1.4738. Thus, in the obtained film, nx=ny<nz and the refractive index in the film thickness direction was large, but the out-of-plane retardation was as small as −45 nm and the absolute value of the out-of-plane retardation relative to the film thickness was also as small as 1.5.

Comparative Example 3

The diisopropyl fumarate homopolymer obtained in Synthesis Example 3 was dissolved in tetrahydrofuran to form a 22 wt % resin solution, and the resin solution was cast on a polyethylene terephthalate film by a coater and dried at 70° C. for 10 minutes to obtain a 21 μm-thick film.

The obtained film had a total light transmittance of 93%, a haze of 0.3%, and a refractive index of 1.468.

The three-dimensional refractive indices were nx=1.4689, ny=1.4689, and nz=1.4723. Thus, in the obtained film, nx=ny<nz and the refractive index in the film thickness direction showed a large value, but the out-of-plane retardation Rth was −71 nm and the absolute value of the out-of-plane retardation relative to the film thickness was as small as 3.4.

These results reveal that the obtained film has negative birefringence, where the refractive index in the thickness direction is large, but the out-of-plane retardation is small and a high out-of-plane retardation cannot be also expected in a thin film.

Comparative Example 4

The fumaric acid diester-based copolymer obtained in Synthesis Example 1 was dissolved in a mixed solvent of toluene/methyl ethyl ketone=50/50 to form a 20 wt % resin solution, and the resin solution was cast on a polyethylene terephthalate film by a coater and dried at 70° C. for 10 minutes to obtain a 15 μm-thick film.

The obtained film had a total light transmittance of 92%, a haze of 0.6%, and a refractive index of 1.472.

The three-dimensional refractive indices were nx=1.4712, ny=1.4712, and nz=1.4743. Thus, in the obtained film, nx=ny<nz and the refractive index in the film thickness direction was large, but the out-of-plane retardation was as small as −47 nm and the absolute value of the out-of-plane retardation relative to the film thickness was also as small as 3.1.

While the invention has been described in detail and with reference to specific embodiments thereof, it will be apparent to one skilled in the art that various changes and modifications can be made therein without departing from the spirit and scope of the invention.

This application is based on Japanese Patent Application (Patent Application No. 2012-162071) filed on Jul. 20, 2012 and Japanese Patent Application (Patent Application No. 2012-233176) filed on Oct. 22, 2012, the entirety of which is incorporated herein by way of reference. Also, all references cited herein are incorporated by reference herein in their entirety.

INDUSTRIAL APPLICABILITY

The diisopropyl fumarate-cinnamic acid derivative-based copolymer of the present invention is suitable for a retardation film having excellent optical properties ensuring that, for example, even a thin film has a high out-of-plane retardation and the refractive index in the film thickness direction is large, and, among others, is suitable for an optical compensation film of a liquid crystal display element. Therefore, the industrial value of the present invention is remarkable.

EXPLANATIONS OF REFERENCE SIGNS nx: denotes the refractive index in the fast axis direction in the film plane.
ny: denotes the refractive index in the film in-plane direction orthogonal to nx.
nz: denotes the refractive index in the thickness direction of the film.

The invention claimed is:

1. A diisopropyl fumarate-cinnamic acid derivative-based copolymer, comprising:
   a diisopropyl fumarate residue unit; and
   a cinnamic acid residue unit or a cinnamic acid ester residue unit having an alkyl group with a carbon number of 1 to 6.

2. The diisopropyl fumarate-cinnamic acid derivative-based copolymer according to claim 1, comprising:
   from 50 to 99 mol % of the diisopropyl fumarate residue unit; and
   from 1 to 50 mol % of the cinnamic acid residue unit or from 1 to 50 mol % of the cinnamic acid ester residue unit having an alkyl group with a carbon number of 1 to 6.

3. The diisopropyl fumarate-cinnamic acid derivative-based copolymer according to claim 1,
   wherein a number average molecular weight in terms of standard polystyrene is from 30,000 to 500,000.

4. The diisopropyl fumarate-cinnamic acid derivative-based copolymer according to claim 1, which is a copolymer selected from the group consisting of a diisopropyl fumarate-methyl cinnamate copolymer, a diisopropyl fumarate-ethyl cinnamate copolymer, and a diisopropyl fumarate-isopropyl cinnamate copolymer.

5. A retardation film comprising the diisopropyl fumarate-cinnamic acid derivative-based copolymer according to claim 1.

6. The retardation film according to claim 5,
   wherein when a refractive index in a fast axis direction in a film plane is denoted by nx, a refractive index in a film in-plane direction orthogonal thereto is denoted by ny, and a refractive index in a film thickness direction is denoted by nz, respective refractive indices satisfy relationship of nx≤ny<nz.

7. The diisopropyl fumarate-cinnamic acid derivative-based copolymer according to claim 1, comprising:
   the diisopropyl fumarate residue unit; and
   the cinnamic acid residue unit.

8. The diisopropyl fumarate-cinnamic acid derivative-based copolymer according to claim 1, comprising:
   the diisopropyl fumarate residue unit; and
   the cinnamic acid ester residue unit having an alkyl group with a carbon number of 1 to 6.

9. The diisopropyl fumarate-cinnamic acid derivative-based copolymer according to claim 1, comprising:
   from 50 to 99 mol % of the diisopropyl fumarate residue unit; and
   from 1 to 50 mol % of the cinnamic acid residue unit.

10. The diisopropyl fumarate-cinnamic acid derivative-based copolymer according to claim 1, comprising:
    from 50 to 99 mol % the diisopropyl fumarate residue unit; and
    from 1 to 50 mol % of the cinnamic acid ester residue unit having an alkyl group with a carbon number of 1 to 6.

11. The diisopropyl fumarate-cinnamic acid derivative-based copolymer according to claim 1, which is a diisopropyl fumarate-methyl cinnamate copolymer.

12. The diisopropyl fumarate-cinnamic acid derivative-based copolymer according to claim 1, which is a diisopropyl fumarate-ethyl cinnamate copolymer.

13. The diisopropyl fumarate-cinnamic acid derivative-based copolymer according to claim 1, which is a diisopropyl fumarate-isopropyl cinnamate copolymer.

* * * * *